(12) United States Patent
Ueda

(10) Patent No.: US 8,162,404 B2
(45) Date of Patent: Apr. 24, 2012

(54) SEAT

(75) Inventor: Katsuya Ueda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 497 days.

(21) Appl. No.: 12/161,361

(22) PCT Filed: Jan. 25, 2007

(86) PCT No.: PCT/JP2007/051182
§ 371 (c)(1),
(2), (4) Date: Jul. 18, 2008

(87) PCT Pub. No.: WO2007/086467
PCT Pub. Date: Aug. 2, 2007

(65) Prior Publication Data
US 2010/0109406 A1  May 6, 2010

(30) Foreign Application Priority Data

Jan. 27, 2006 (JP) ................ 2006-019195

(51) Int. Cl.
*A47C 31/00* (2006.01)
*B60N 2/16* (2006.01)
*B60N 2/44* (2006.01)
(52) U.S. Cl. ............... 297/463.1; 297/344.12
(58) Field of Classification Search . 297/344.12–344.15
See application file for complete search history.

(56) References Cited

U.S. PATENT DOCUMENTS

| | | |
|---|---|---|
| 3,953,069 A | 4/1976 | Tamura et al. |
| 3,957,312 A | 5/1976 | Bonnaud |
| 3,958,828 A | 5/1976 | Ishida et al. |
| 4,146,267 A | 3/1979 | Mori et al. |
| 4,437,703 A | 3/1984 | Nishikori et al. |
| 4,461,511 A | 7/1984 | Berneking et al. |
| 4,466,661 A | 8/1984 | Narita |

(Continued)

FOREIGN PATENT DOCUMENTS

DE      33 19 397 A1      11/1984

(Continued)

OTHER PUBLICATIONS

T. Ishijima et al., "Seat", U.S. Appl. No. 12/159,808, filed Jul. 1, 2008.

(Continued)

*Primary Examiner* — David Dunn
*Assistant Examiner* — Tania Abraham
(74) *Attorney, Agent, or Firm* — Finnegan, Henderson, Farabow, Garrett & Dunner, LLP

(57) ABSTRACT

A seat operation device having improved operability of both a height adjustment mechanism and an angle adjustment mechanism, and a seat. The vehicle seat (10) has a seat lifter (22) that is provided at a seat body for seating and is adjusted by operation force transmitted, a reclining mechanism (20) that is provided at the seat body and is adjusted by operation force transmitted, and an operation lever (30) that adjusts the seat lifter (22) and the reclining mechanism (20). The operation lever (30) can take both a first predetermined position and a second predetermined position. At the first predetermined position, operation force by operation of a person seated can be transmitted to an operation load input section (28) of the seat lifter (22). At the second predetermined position, operation force by operation of the person seated can be transmitted to a reclining release plate (38) of the reclining mechanism (20).

4 Claims, 7 Drawing Sheets

U.S. PATENT DOCUMENTS

| | | |
|---|---|---|
| 4,580,838 A | 4/1986 | Schottker et al. |
| 4,653,807 A | 3/1987 | Hirose et al. |
| 4,700,989 A | 10/1987 | Ercilla |
| 4,995,669 A | 2/1991 | Croft |
| 5,393,116 A | 2/1995 | Bolsworth et al. |
| 5,597,206 A | 1/1997 | Ainsworth et al. |
| 5,611,599 A | 3/1997 | Baloche et al. |
| 5,700,055 A | 12/1997 | Davidson et al. |
| 5,788,330 A | 8/1998 | Ryan |
| 5,918,940 A | 7/1999 | Wakamatsu et al. |
| 6,120,098 A | 9/2000 | Magyar et al. |
| 6,402,249 B1 | 6/2002 | Rohee et al. |
| 6,619,744 B2 | 9/2003 | Reubeuze |
| 6,663,180 B2 | 12/2003 | LeTournoux |
| 7,293,838 B2 | 11/2007 | Sugama et al. |
| 7,472,963 B2 | 1/2009 | Jeong |
| 7,494,186 B2 | 2/2009 | Paing et al. |
| 2009/0026791 A1 | 1/2009 | Ishijima et al. |
| 2009/0026825 A1 | 1/2009 | Ishijima et al. |
| 2009/0058158 A1 | 3/2009 | Sobieski |
| 2010/0109406 A1 | 5/2010 | Ueda |

FOREIGN PATENT DOCUMENTS

| | | |
|---|---|---|
| DE | 10015772 | 6/2001 |
| FR | 2 770 181 | 4/1999 |
| GB | 2 144 511 | 3/1985 |
| JP | 61-5976 | 1/1986 |
| JP | 63-36423 | 9/1988 |
| JP | 63-60404 | 11/1988 |
| JP | 2-36757 | 10/1990 |
| JP | 04-000854 | 1/1992 |
| JP | 8-26007 | 1/1996 |
| JP | 8-268128 | 10/1996 |
| JP | 2000-255295 | 9/2000 |
| JP | 2001-130294 | 5/2001 |
| WO | WO 2007/086465 A1 | 8/2007 |
| WO | WO 2007/086466 A1 | 8/2007 |

OTHER PUBLICATIONS

Supplementary European Search Report dated Jun. 18, 2009.
U.S. Appl. No. 12/161,873, filed Jul. 23, 2008.
U.S. Appl. No. 12/161,856, filed Jul. 23, 2008.

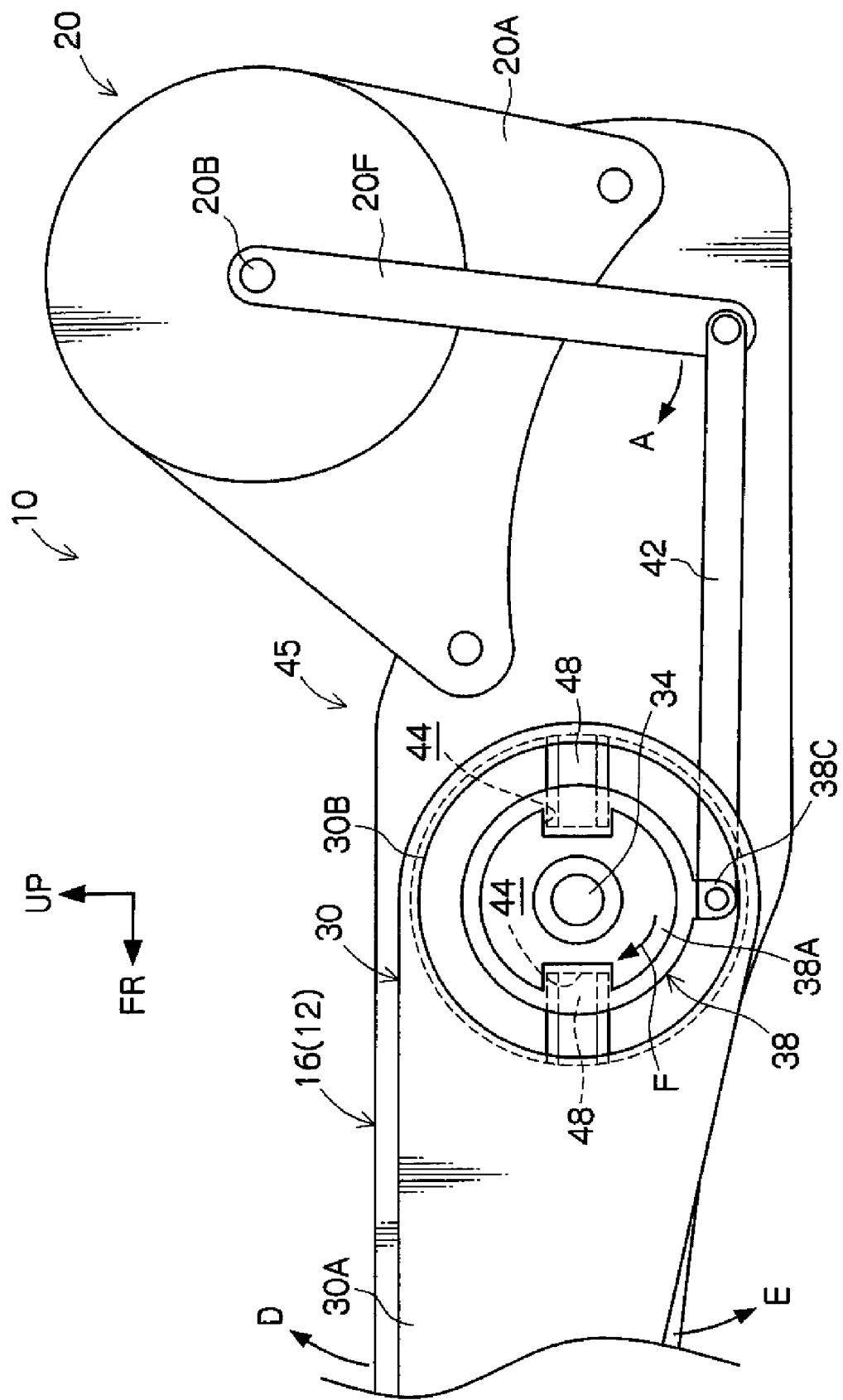

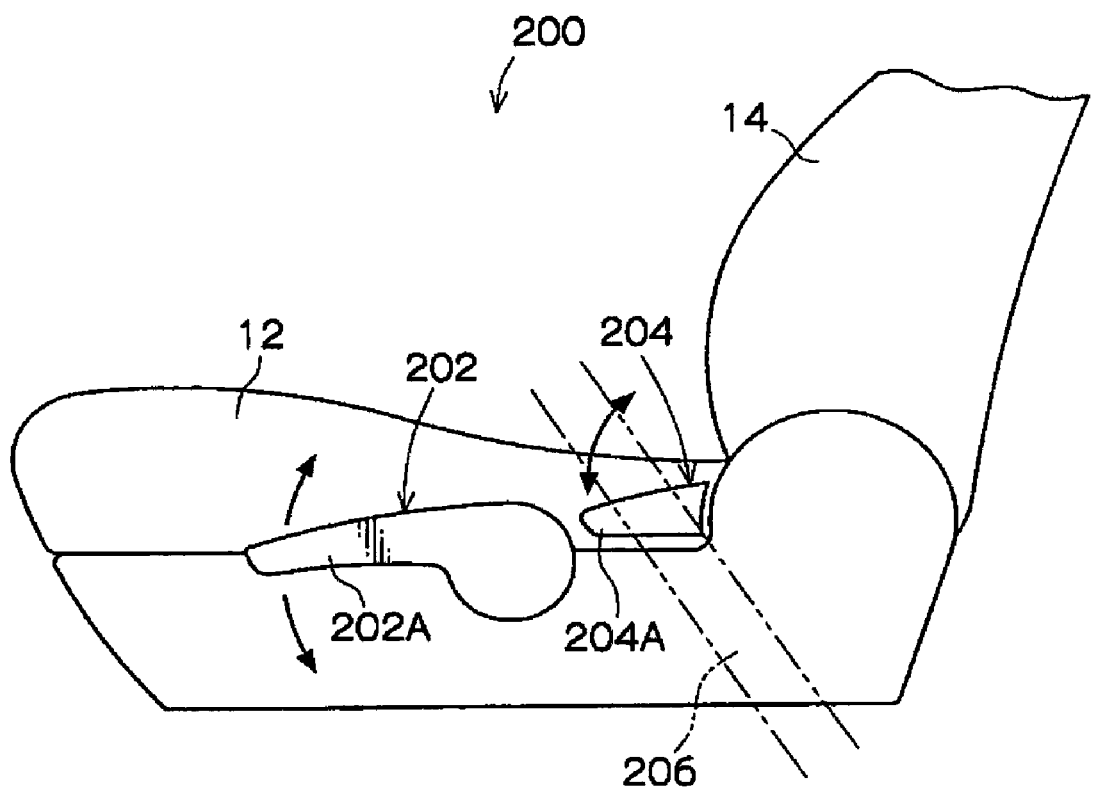

SEAT

CROSS-REFERENCE TO RELATED APPLICATIONS

This application is a national phase application of International Application No. PCT/JP2007/051182, filed Jan. 25, 2007, and claims the priority of Japanese Application No. 2006-019195, filed Jan. 27, 2006, the contents of both of which is incorporated herein by reference.

TECHNICAL FIELD

The present invention relates to a seat such as, for example, a seat mounted to an automobile for an occupant to sit on.

RELATED ART

Vehicle seats are known that are provided with an operation lever for releasing the lock of a reclining mechanism and making the adjustment of the angle of a seat back possible, and a knob for adjusting the height of a seat cushion (see, for example, Japanese Patent Application Laid-Open (JP-A) No. 2001-130294). As the operation lever and the knob, these are each disposed at a distance from each other at a seat width direction outside edge portion, and are able to be operated independently so that they do not interfere with each other.

Vehicle seats are also known that are configured with a reclining lever that is operable in two stages, at the first stage of operation the lock of a reclining mechanism is released and adjustment of the angle of the seat back is made possible, and at the second stage of operation the adjustment of the angle of the seat back remains possible but the seat is configured such that a height lever is engaged and the seat is raised (see, for example, JP-A No. H8-26007).

DISCLOSURE OF THE INVENTION

Problem to be Solved by the Invention

However, in the first of the above described technologies, since the operation lever and the knob are provided as separate items, it is difficult to dispose both of these in positions that have good operability. On the other hand in the second of the above described technologies, since the release of the lock of the height lock mechanism (operation of the height lever) cannot be carried out independently of the release of the reclining lock, this does not contribute to increased operability.

Consideration has been made of the above points and an object of the present invention is to provide a seat with that is able to improve the operability of plural adjustable units.

Method of Solving the Problem

A seat of a first aspect of the present invention includes: a first adjustable unit, provided to a seat body that is for sitting on, the first adjustable unit being adjusted by transmitted operation force; a second adjustable unit, provided to the seat body, the second adjustable unit being adjusted by transmitted operation force; and an operation member, able to take up a first predetermined position in which operation force from operation by a seat occupant is able to be transmitted to the first adjustable unit, and a second predetermined position in which operation force from operation by a seat occupant is able to be transmitted to the second adjustable unit.

By the above aspect, when the operation member is positioned in the first predetermined position and the operation member is operated, this operation force is transmitted to the first adjustable unit and the first adjustable unit is adjusted, or the first adjustable unit is placed in a state in which it is adjustable (a lock released state or the like, for example) by this operation force. On the other hand, when the operation member is positioned in the second predetermined position and the operation member is operated, this operation force is transmitted to the second adjustable unit and the second adjustable unit is adjusted, or by this operation force the second adjustable unit is placed in a state in which it is adjustable (a lock released state or the like, for example).

Thereby, a first adjustable unit and a second adjustable unit may be selectively, namely independently, adjusted by a single operation member. In doing so, in comparison to a configuration in which two operation members are provided for independent operation of the first and second adjustable units, limitations are reduced for the placement and size of the operational region of a seat occupant, and an increase in the degrees of freedom for design may be achieved. Therefore, for example, by disposing the single operation member, which is capable of independently operating the first and the second adjustable unit, in a position at the seat cushion that has good operability, both a height adjusting mechanism and an angle adjusting mechanism may be operated with good operability.

In this manner, the seat of the above described aspect is able to improve the operability of plural adjustable units. It should be noted that there may be three or more adjustable units and the operation member may be provided with the functionality of three or more operation force imparting mechanisms corresponding thereto.

In the above aspect, it is preferable that a movement direction of the operation member between the first predetermined position and the second predetermined position is different from both an operation direction when operation force is transmitted to the first adjustable unit, and from an operation direction when operation force is transmitted to the second adjustable unit.

By the above aspect, the operation direction of the operation member when switching from a state of being able to adjust the first adjustable unit to being able to adjust the second adjustable unit is different from the operation direction of the operation member when adjusting the first or the second adjustable unit, therefore unintentional operation by a seat occupant may be avoided.

In the above aspect, it is preferable that the operation member: is provided to a side portion of a seat cushion configuring the seat body; is supported so as to be able to rotate with respect to the seat cushion about an axis along the seat width direction; transmits operation force from rotation about the axis to the first adjustable unit or to the second adjustable unit; and switches between the first predetermined position and the second predetermined position by displacement along the seat width direction.

By the above aspect, when the operation member in the first predetermined position rotates about the axis along the seat width direction this operation force is transmitted to the first adjustable unit. Also, when the operation member is operated along the seat width direction (rotational axis) from the first predetermined position to the outside in the width direction, the operation member is moved to the second predetermined position. When the operation member positioned in this second predetermined position is operated about an axis along the seat width direction, this operation force is transmitted to the second adjustable unit. Furthermore, when the operation member is operated from the second predetermined position along the seat width direction to the inside in the width direction, the operation member is moved to the first predetermined position.

In this seat, the single operation member may be disposed at a side portion of the seat cushion in a position with good operability. Also, since the operation direction of the operation member in the first predetermined position and the operation direction of the operation member in the second predetermined position are the same, adjustment of the two adjustable units may be carried out without imparting an awkward feeling to the operator (seat occupant).

In the above aspect, it is preferable that the operation member is a lever in which: the rear end side in the seat front-rear direction is supported so as to be able to rotate with respect to the seat cushion about an axis along the seat width direction; and operation force is imparted upward or downward to the seat front-rear direction front end thereof.

By the above aspect, when the front end side of an operation member, which is a lever that is long in the front-rear direction, is operated upward or downward, the rear end side of the operation member, which is the support portion thereof, rotates about an axis in the seat width direction, and operation force is transmitted to the first adjustable unit or to the second adjustable unit according to the position of the operation member (the first predetermined position or the second predetermined position). In doing so, each of the adjustable units may be adjusted by a small operation force.

In the above aspect, it is preferable that the operation member has an engaging portion. In the first predetermined position the engaging portion engages with an engageable portion of the first adjustable unit so as to make it possible for operation force to be transmitted thereto, and engagement with an engageable portion of the second adjustable unit is released. In the second predetermined position the engagement with the engageable portion of the first adjustable unit is released, and the engaging portion engages with the engageable portion of the second adjustable unit so as to make it possible for operation force to be transmitted thereto.

By the above aspect, when the operation member is positioned in the first predetermined position, the engaging portion of the operation member is engaged to the first adjustable unit, and by this engagement, operation force from the operation member is able to be transmitted to the first adjustable unit. When this occurs, since engagement of the engaging portion to the engageable portion of the second adjustable unit is released, operation force of the operation member is not able to be transmitted to the second adjustable unit. However, when the operation member is positioned in the second predetermined position, the engaging portion of the operation member engages with the engageable portion of the second adjustable unit, and by this engagement, operation force of the operation member is able to be transmitted to the second adjustable unit. When this occurs, since engagement of the engaging portion to the engageable portion of the first adjustable unit is released, operation force of the operation member is not able to be transmitted to the first adjustable unit. In this manner, the seat realizes the functionality to selectively (with certain independence) adjust plural adjustable units with a simple structure.

In the above aspect, it is preferable that the seat further includes a biasing member that biases the operation member to the first predetermined position.

By the above aspect, the non-operation state of the operation member is biased to the first predetermined position, namely retained there, by biasing force from the biasing member. Thereby, the adjustable unit to be adjusted may be selected without the need for the position of the operation member in the non-operation state to be confirmed such as by sight, or the like. Furthermore, there is good operability due to the operation member returning to the first predetermined position after adjusting the second adjustable unit.

In the above aspect, it is preferable that one of the first adjustable unit or the second adjustable unit is a height adjusting mechanism for adjusting the position of the seat body in the up-down direction; and the other of the first adjustable unit or the second adjustable unit is a reclining mechanism for switching between a state in which the angle of a seat back is locked with respect to a seat cushion, and an unlocked state thereof.

By the above aspect, a reclining mechanism and a height adjusting mechanism may be operated by a common operation member, and, therefore, in comparison to when individual operation members are independently provided, there are few limitations to the placement, dimensions and shape of the operation member. As a result, by placing the operation member at a position at which operability for the seat occupant is good, good operability of a reclining mechanism and a height adjusting mechanism may be realized.

Effect of the Invention

The seat according to the present invention, as has been explained above, has the superior effect of being able to improve the operability of plural adjustable units.

BRIEF DESCRIPTION OF THE DRAWINGS

FIG. 2 is a side view schematically showing the relationship between adjustable units, of a reclining mechanism and a seat lifter, and an operation lever of a vehicle seat according to an exemplary embodiment of the present invention;

FIG. 8 is a side view showing a seat according to a comparative example to that of a vehicle seat according to an exemplary embodiment of the present invention.

BEST MODE OF IMPLEMENTING THE INVENTION

Explanation will now be given regarding the vehicle seat 10 as a seat according to a first exemplary embodiment of the present invention, with reference to FIGS. 1 to 7. It should be noted that in each of the figures the appropriately shown arrow FR, arrow UP and arrow W represent the front direction (direction of progression) of an automobile to which the vehicle seat 10 has been applied, the up direction thereof and the vehicle width direction, and these match the front direction, up direction and width direction of the vehicle seat 10. When reference is simply made below to the front-rear direction, up-down direction and width direction this indicates respective directions with reference to the above described vehicle seat (automobile).

Figure 5:
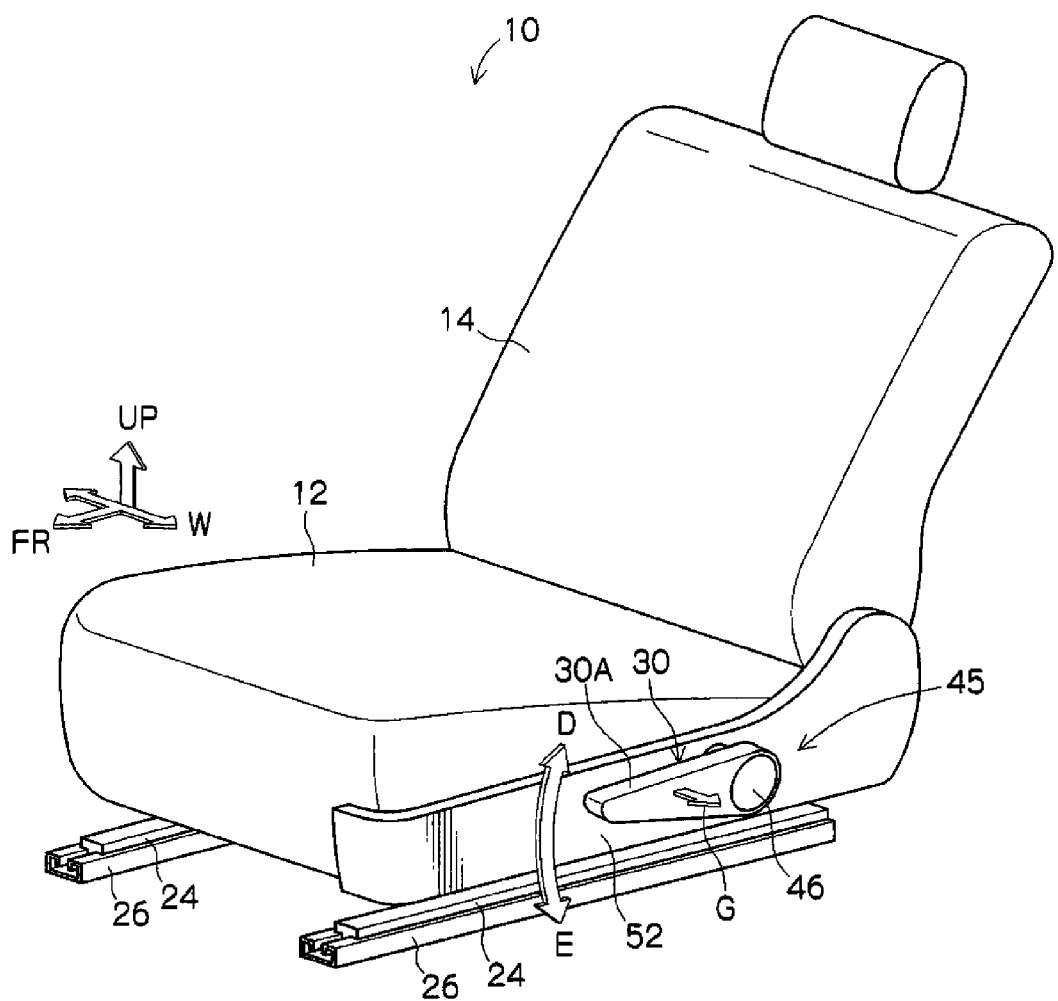
FIG. 5 is a perspective view showing the overall configuration of a vehicle seat according to an exemplary embodiment of the present invention.
Figure 7:
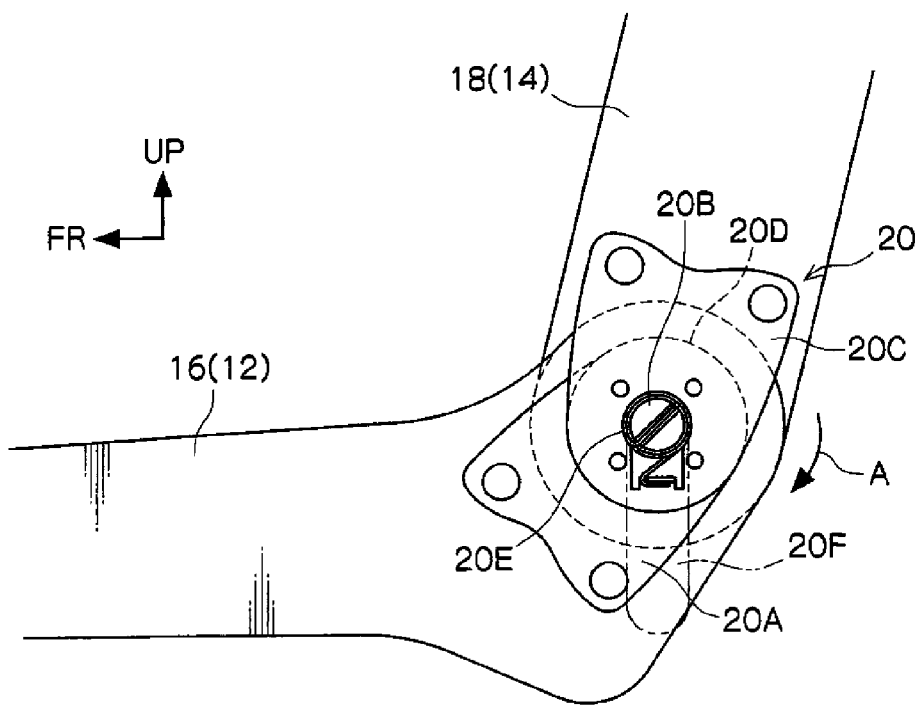
FIG. 7 is a side view showing a reclining mechanism configuring a vehicle seat according to an exemplary embodiment of the present invention.

FIG. 5 shows an outline of the overall configuration of the vehicle seat 10 in perspective view. As shown in the figure, the vehicle seat 10 is provided with a seat cushion 12 that is for an occupant for sitting on and a seat back 14, supporting the upper body of a seated occupant from the rear. As shown in FIG. 7, the back edge portion of a seat cushion frame 16 configuring the seat cushion 12, and the bottom edge portion of a seat back frame 18 configuring the seat back 14, are connected together, in such a way that the relative angle therebetween may be adjusted, through reclining mechanisms 20 serving as angle adjusting mechanisms (first or second adjustable units). There is a reclining mechanism 20 provided at both sides in the width direction, and the reclining mechanisms 20 are coupled together by a non illustrated interlocking mechanism.

As shown in FIG. 7, the reclining mechanism 20 is configured including main components of: a cushion side bracket 20A, which is fixed to the seat cushion frame 16; a back side bracket 20C, which is connected to the cushion side bracket 20A through a reclining shaft 20B and is also fixed to the seat back frame 18; a lock connecting portion 20D, which has the relative angle of the cushion side bracket 20A and the back side bracket 20C adjustable in plural stages, or continuously adjustable, about the reclining shaft 20B, and which may be locked at a desired angle; and a torsion spring 20E, which biases the lock connecting portion 20D to the lock side to inhibit relative angular displacement between the cushion side bracket 20A and the back side bracket 20C. Also, the reclining mechanism 20 that is on one side in the seat width direction (on the vehicle width direction outside, for example) is provided with a lock release arm 20F that has been connected at one end in the length direction thereof to the reclining shaft 20B and is rotatable as one therewith. Since the lock connecting portion 20D may be obtained from various known structures, explanation of the structure thereof will be omitted.

This pair of reclining mechanisms 20 is configured so that, when the lock connecting portion 20D is in the locked state, a desired angle of inclination of the seat back 14 (seat back frame 18) with respect to the seat cushion 12 (seat cushion frame 16) is maintained. Furthermore, when in the pair of reclining mechanisms 20 the lock release arm 20F rotates in the direction of arrow A, as shown in FIG. 7, against the biasing force of the torsion spring 20E, then the respective lock connecting portions 20D are released from the locked state by the rotation directly, or by the rotation transmitted by the interlocking mechanism.

There is a non illustrated return spring disposed between the seat cushion 12 and the seat back 14, and when each of the reclining mechanisms 20 is in the lock released state and there is no load on the seat back 14 then the seat back 14 tilts forward to a predetermined position relative to the seat cushion 12. However, when each of the reclining mechanisms 20 is in the lock released state and a load of a predetermined value or above acts toward the rear on the seat back 14, the seat back 14 tilts to the rear relative to the seat cushion 12.

Also, when the operation force of the lock release arm 20F is released when the seat back 14 is at a desired angle of inclination relative to the seat cushion 12, the reclining mechanisms 20 return to the locked state due to the biasing force of the torsion spring 20E, and the seat back 14 is maintained at the desired angle of inclination relative to the seat cushion 12. The lock release of the reclining mechanisms 20 is achieved by a link 42 transmitting operation force from an operation lever 30 (these will be described later) taking up a recliner selected state, to the lock release arm 20F.

Figure 6:
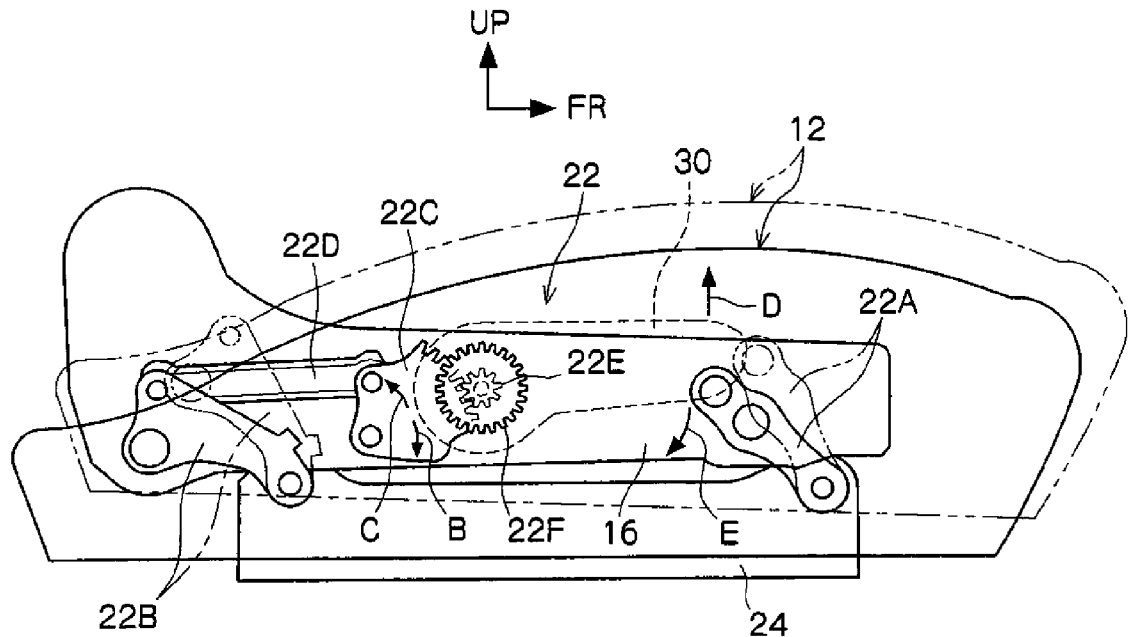
FIG. 6 is a side view showing a seat lifter configuring a vehicle seat according to an exemplary embodiment of the present invention.

The vehicle seat 10 is also provided with a seat lifter 22 like the one shown in FIG. 6, serving as an adjustable unit (first or second adjustable unit). The seat lifter 22 is provided with a pair of front-rear links 22A, 22B that each have top and bottom ends thereof rotatably connected to an upper rail 24 and to the seat cushion frame 16, and the front-rear links 22A, 2213 together with the upper rail 24 and the seat cushion frame 16 configure a quadric crank chain. The upper rail 24 is supported so as to be able to slide in the front-rear direction on lower rails 26 (see FIG. 5), which are fixed to the vehicle body floor.

The front-rear links 22A, 22B are disposed such that phantom lines connecting top and bottom connecting portions (rotational shafts) of each are substantially parallel to each other and are inclined down toward the rear, and it is configured such that, by changing the rearward angle of inclination, the seat cushion frame 16 may be moved in the up-down direction relative to the upper rail 24 and moved toward or away from the upper rail 24. It should be noted that in FIG. 6 the solid lines and the two-dot chain lines show, respectively, the lower limit position and the upper limit position of the seat cushion frame 16 (seat cushion 12) relative to the upper rail 24.

There is also a lifter gear 22C provided to the seat lifter 22 and rotatably axially supported on the seat cushion frame 16, and a front end portion of a connecting link 22D is connected rotatably to the upper portion of a rotational shaft of the lifter gear 22C. The rear end portion of the connecting link 22D is connected rotatably to the upper part of the connecting portion of the link 22B with the seat cushion frame 16. Thereby, in the seat lifter 22, when the lifter gear 22C is rotated in the direction of arrow B, the link 22B rotates to the standing up direction side and the seat cushion frame 16 displaces upward, and when the lifter gear 22C is rotated in the opposite direction to that of arrow B, in the direction of arrow C, then the link 22B rotates to incline toward the rear and the seat cushion frame 16 displaces downward.

The seat lifter 22 is provided with a pinion 22E that is meshed with the lifter gear 22C, and the pinion 22E is connectable to an operation lever 30 through a pump lifter mechanism 22F (an operation load input portion 28, described later). The pump lifter mechanism 22F is supported on the seat cushion frame 16, and the lifter gear 22C is rotated in the direction of arrow B, through the pinion 22E, by the operation lever 30 taking up a lifter selected state, described later, by rotation in the direction of arrow D, and it is configured such that when the operation lever 30 is being returned from a rotational position on the arrow D side (referred to below as the upper side operation position) to a neutral position that is a non-operation position, operation force is not transmitted to the pinion 22E.

In the same manner, the pump lifter mechanism 22F rotates the lifter gear 22C in the direction of arrow C, through the pinion 22E, by the rotation in the direction of arrow E of the operation lever 30 taking up the lifter selected state, and it is configured such that when the operation lever 30 is being returned from a rotational position at the arrow E side (referred to below as the lower operation position) to a neutral position, operation force is not transmitted to the pinion 22E.

The pump lifter mechanism 22F also has a braking function such that the pinion 22E does not rotate in the reverse direction due to force from the lifter gear 22C side. It should be noted that there is a biasing member included in the pump lifter mechanism 22F that biases the operation lever 30 to toward the neutral position side, and there is no requirement for operation force to return the operation lever 30 to the neutral position.

By the above, the seat lifter 22 raises the seat cushion 12 relative to the vehicle body floor with a reciprocating swinging movement by rotation of the operation lever 30 between the neutral position and the rotational position on the arrow D side, and the seat lifter 22 lowers the seat cushion 12 relative to the vehicle body floor with a reciprocating swinging movement by rotation of the operation lever 30 between the neutral position and the rotational position on the direction of arrow E side. Also, the seat cushion 12 may be maintained at a desired height against a seating load.

Figure 1:
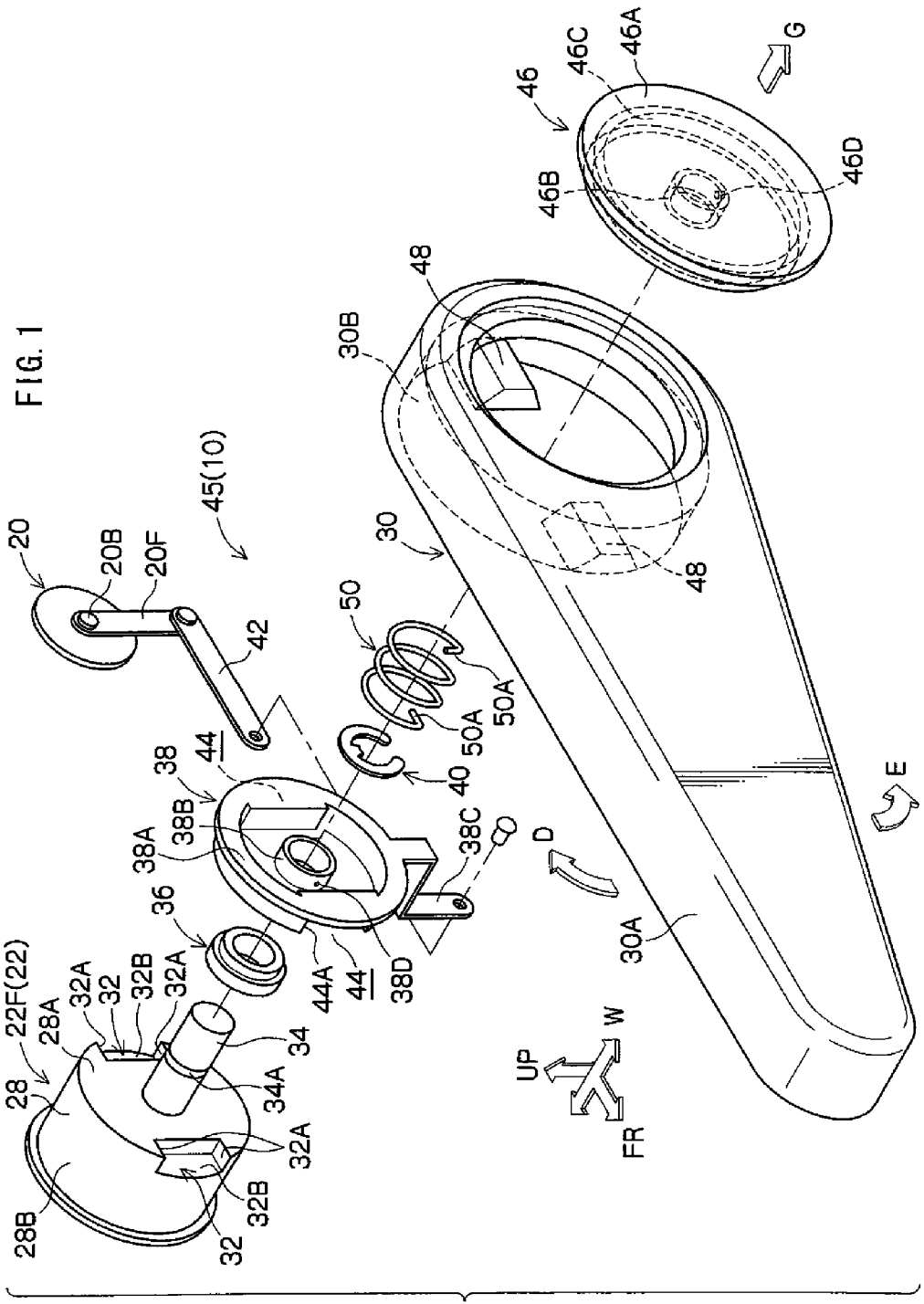
FIG. 1 is an exploded perspective view of a switching mechanism portion of an operation force transmission path for an operation lever configuring a vehicle seat according to an exemplary embodiment of the present invention.

As shown in FIG. 1, an operation load input portion 28 to which operation force from the operation lever 30 is input is provided to the pump lifter mechanism 22F configuring the seat lifter 22. The operation load input portion 28 has a bottom portion 28A, positioned at the seat width direction outside end thereof and formed with a bottomed circular cylindrical shape, and there is a front-rear pair of engageable recess portions 32, serving as engageable portions, formed straddling the bottom portion 28A and a peripheral wall portion 28B thereto, with openings of the engageable recess portions 32 facing the outside in the radial direction (front-rear direction) and facing the outside in the seat width direction. In these engageable recess portions 32, the pair of wall portions that oppose each other in the up-down direction are engagement walls 32A, and the wall portions that face toward the seat width direction outside are stopper walls 32B.

There is also a shaft 34 provided, configuring the axial portion of the pump lifter mechanism 22F, the shaft 34 being connected to the pinion 22E (not illustrated) so as to be able to rotate as one therewith. Details of the explanation will be omitted, but the operation load input portion 28 is connected to the shaft 34 through a mechanism such as a gear train, not illustrated, mounted within the operation load input portion 28 so as to be able to achieve the lifter function of the pump lifter mechanism 22F when the operation lever 30 is rotated, as will be described later, in the direction of arrow D or the direction of arrow E. In this exemplary embodiment, the shaft 34 pierces through the bottom portion 28A of the operation load input portion 28, and protrudes further to the seat width direction outside than the bottom portion 28A.

There is a ring fitting groove 34A formed to the shaft 34 at an intermediate portion thereof that is positioned further to the outside in the seat width direction than the bottom portion 28A. A reclining release plate 38 is disposed to the shaft 34, with a spacer 36 between itself and the bottom portion 28A, and the reclining release plate 38 is axially supported so as to be able to rotate independently from the operation load input portion 28. Specifically, the reclining release plate 38 has main configuring components of: a plate body 38A that is formed into a shape like that of a hat, with a flange extending from the open end of a bottomed circular cylinder that is open toward the outside in the seat width direction; a circular cylinder-shaped supported boss portion 38B, that extends outside in the seat width direction from the axial portion of the plate body 38A; and an arm portion 38C, that extends toward the outside in a radial direction from a portion (the bottom side in the present exemplary embodiment) of the peripheral edge of the plate body 38A.

This reclining release plate 38 has the supported boss portion 38B fitted to the shaft 34, with some clearance therein, so as to be axially supported and to be able to relatively rotate. Also, the reclining release plate 38 is restricted from relatively displacing in the axial direction (seat width direction) with respect to the shaft 34, by a removal prevention ring (E-ring) 40 fitted to the ring fitting groove 34A and by the spacer 36.

Figure 3A:
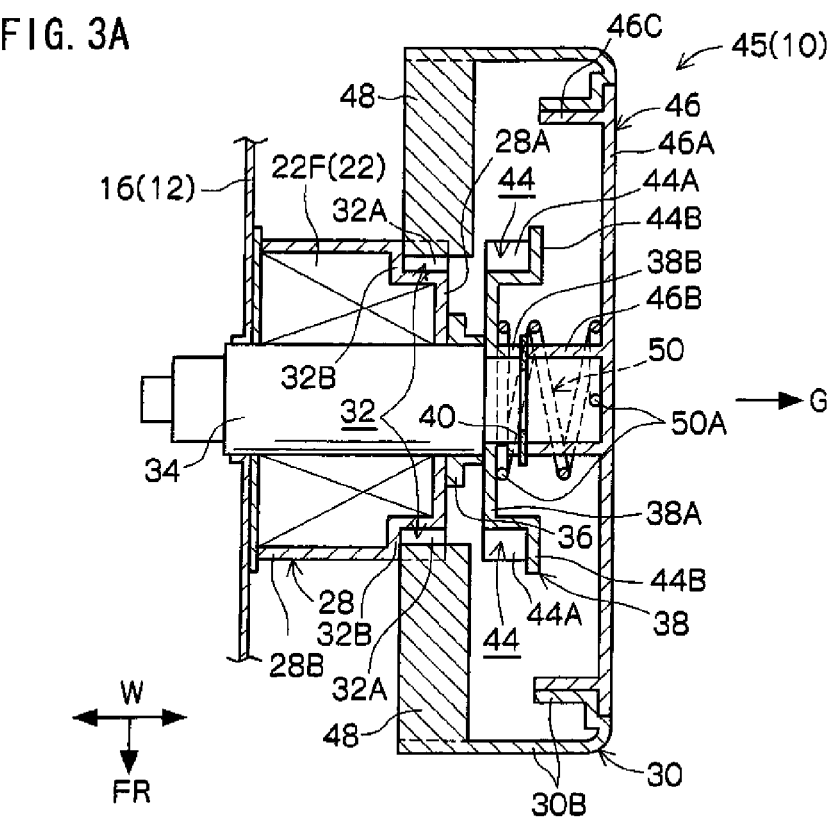
FIG. 3A is a plan view cross-section showing a lifter selected state of a vehicle seat according to an exemplary embodiment of the present invention.
Figure 3B:
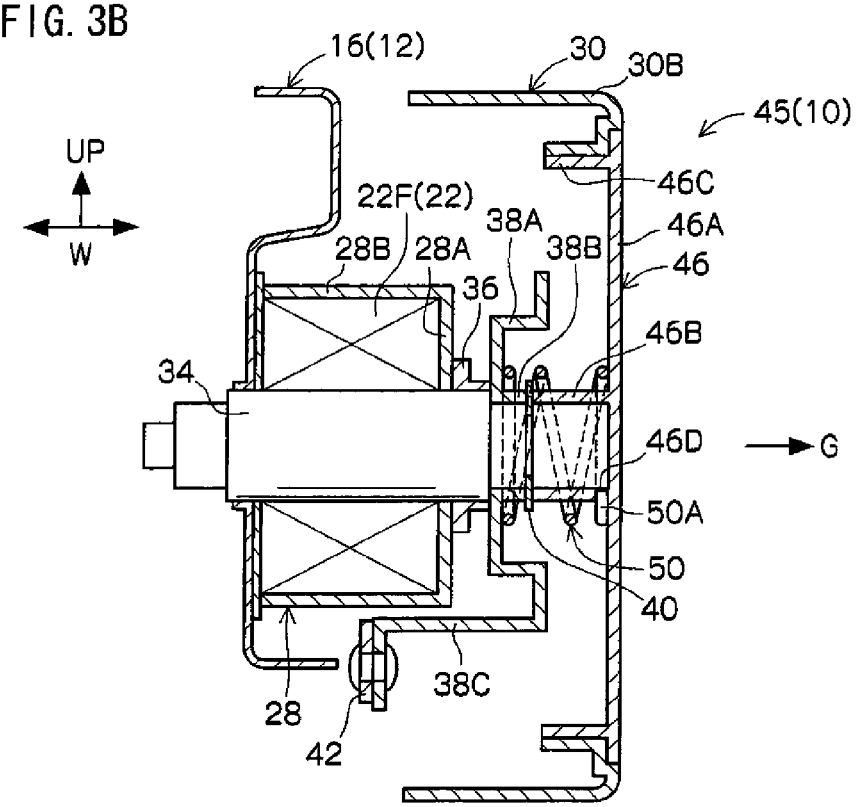
FIG. 3B is a front view cross-section showing the lifter selected state of a vehicle seat according to an exemplary embodiment of the present invention.
Figure 4A:
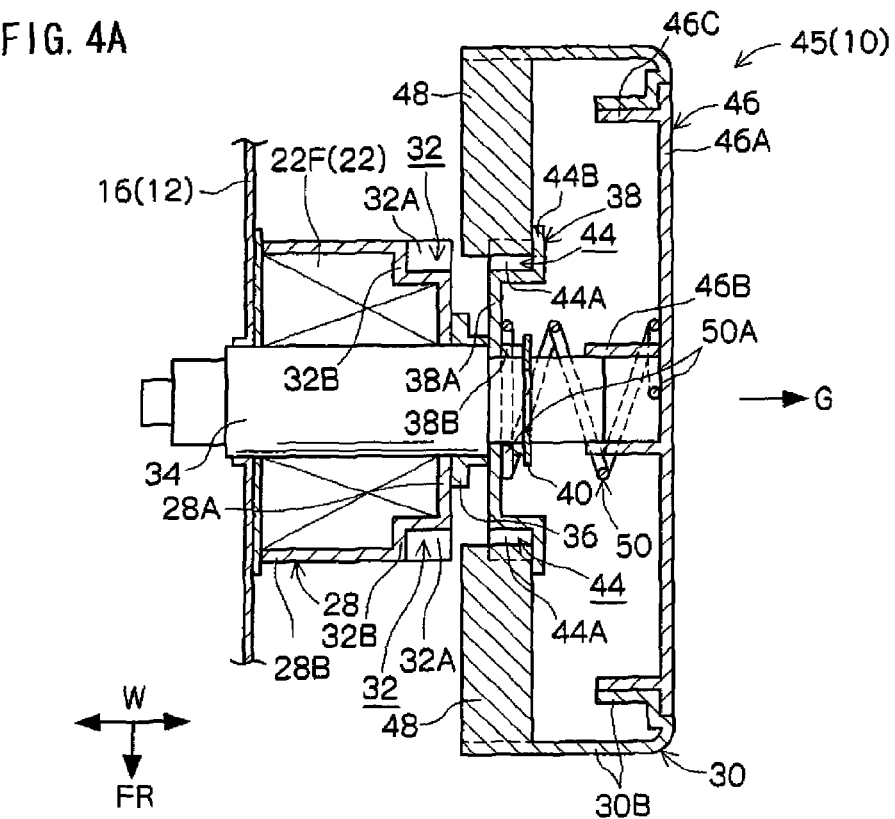
FIG. 4A is a plan view cross-section showing a recliner selected state of a vehicle seat according to an exemplary embodiment of the present invention.
Figure 4B:
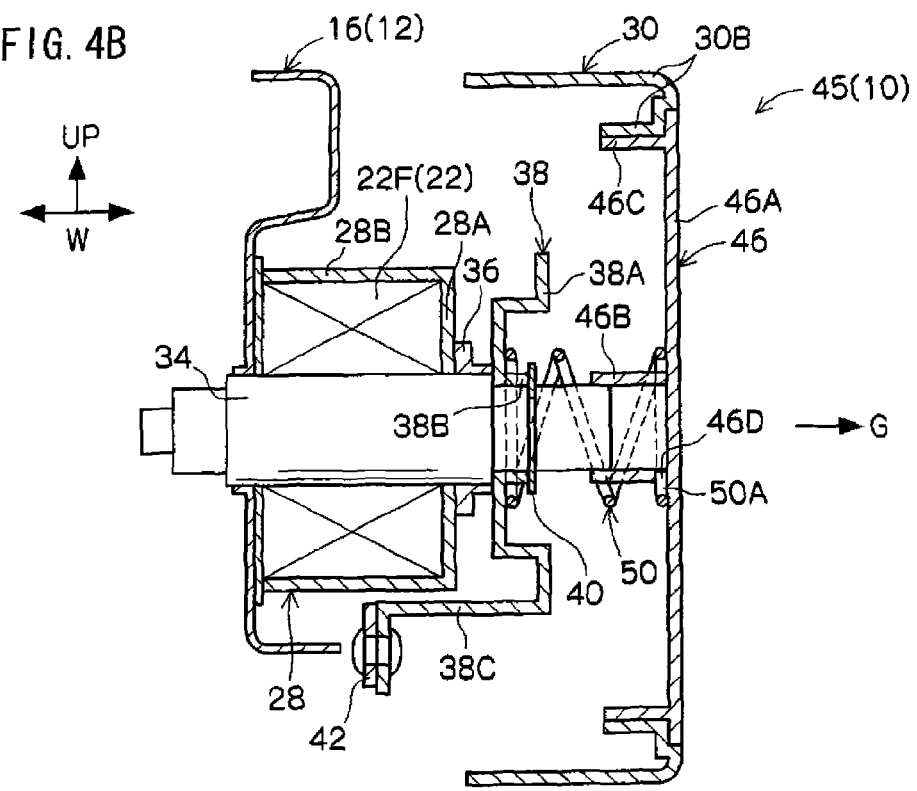
FIG. 4B is a front view cross-section showing the recliner selected state of a vehicle seat according to an exemplary embodiment of the present invention.

As shown in FIG. 1 and FIG. 2, the arm portion 38C of the reclining release plate 38 explained above is connected to the front end of the link 42, the rear end thereof being connected to the lock release arm 20F. As shown in FIG. 3B and FIG. 4B, the arm portion 38C is appropriately bent, and is connected to the front end of the link 42 at the bottom of the operation load input portion 28. Thereby, when the reclining release plate 38 rotates in the direction of arrow F, the link 42 moves forward and the lock release arm 20F rotates in the direction of arrow A. In the state in which no operation force is imparted thereto, the reclining release plate 38 maintains a predetermined position by the biasing force from the torsion spring 20E (engaging with a non illustrated stopper).

There is a front-rear pair of engageable recess portions 44, serving as engaging portions, formed to the plate body 38A of the reclining release plate 38, so as to straddle the bottom portion and the peripheral wall portion thereof, with openings of the engageable recess portions 44 toward the outside in the radial direction (front-rear direction) and toward the inside in the seat width direction. The pairs of wall portions of the engageable recess portions 44 that oppose each other in the up-down direction are each engaging walls 44A, and the wall portions that face the inside in the seat width direction are stopper walls 44B. Each of the engageable recess portions 44 has an opening width in the up-down direction, and depth in the radial direction that are of equivalent dimensions to those of the corresponding engageable recess portions 32 of the operation load input portion 28, and the reclining release plate 38 and the operation load input portion 28 are relatively positioned in the state in which no operation force is imparted to either such that the engageable recess portions 44 correspond to the respective engageable recess portions 32.

Also, as shown in FIG. 5, there is an operation portion 45 provided to the vehicle seat 10, for operating independently the reclining mechanism 20 and the seat lifter 22, and the operation portion 45 is configured with the operation lever 30 as a single operation member. The operation lever 30 is provided disposed to the side of the seat cushion 12, and is configured so as to selectively take up a first predetermined position in which operation force is imparted to the operation load input portion 28 on the seat lifter 22 side, and a second predetermined position in which operation force is imparted to the reclining release plate 38 on the reclining mechanism 20 side. Specific explanation thereof will now be given.

As shown in FIG. 1, the operation lever 30 is long in the front-rear direction, and the front end side thereof is an operation portion 30A, and the rear end side thereof has a supported portion 30B that is formed as a short circular cylinder with the axial direction thereof being along the seat width direction. The supported portion 30B of the operation lever 30 is supported, through a lever cap 46, so as to be able to rotate on the shaft 34. The lever cap 46 has main configuring portions of a cover portion 46A, formed in a circular plate shape and closing off the open end of the supported portion 30B at the outside in the seat width direction thereof; a supported boss 46B, formed as a circular cylinder shape, provided protruding out from an axial portion of the cover portion 46A toward the seat width direction inside; and a lever support boss portion 46C, provided protruding out from the vicinity of the peripheral edge of the cover portion 46A, and protruding toward the seat width direction inside, coaxially to the supported boss 46B. The supported boss 46B of the lever cap 46 is fitted to the leading end portion of the shaft 34 with some clearance therebetween, and the lever cap 46 is rotatably supported with respect to the shaft 34.

The lever cap 46 also axially supports the operation lever 30 that is fitted together with the lever support boss portion 46C, at the seat width direction outside end side of the supported portion 3013. The operation lever 30 is thereby supported so as to be able to rotate, relative to the shaft 34 of the pump lifter mechanism 22F, independently to rotation of the operation load input portion 28 and the reclining release plate 38. Furthermore, the operation lever 30 is able to relatively displace in the axial direction with respect to the shaft 34, by sliding movement of the supported boss 46B on the shaft 34.

There is a front-rear pair of engaging protrusions 48, each serving as an engaging portion, provided projecting out to the inside in the radial direction at the open end of the supported portion 30B of the operation lever 30, at the inside in the seat width direction thereof. The operation lever 30 has a position, as shown in FIG. 3A, that corresponds to when the front-rear pair of engaging protrusions 48 are intruded into the engageable recess portions 32, this position being the first predetermined position, and a position, as shown in FIG. 4A, that corresponds to when the front-rear pair of engaging protrusions 48 are intruded into the engageable recess portions 44, this position being a second predetermined position. The operation portion 45 is configured such that when the operation lever 30 is positioned in the first predetermined position, the front-rear pair of engaging protrusions 48 are removed from the respective corresponding engageable recess portions 44, and when the operation lever 30 is positioned in the second predetermined position, the front-rear pair of engaging protrusions 48 are removed from the respective corresponding engageable recess portions 32.

The operation lever 30 is configured so as to switch, by relative displacement in the axial direction relative to the shaft 34, between the above described first predetermined position selected state (referred to below as the lifter selected state), and the second predetermined position selected state (referred to below as the recliner selected state). It should be noted that it may be configured such that a position may be passed through, during moving between the first predetermined position and the second predetermined position, in which the front-rear pair of engaging protrusions 48 are removed from both the engageable recess portions 32 and from the engageable recess portions 44. By such a configuration, there will be no position on the movement path between the first predetermined position and the second predetermined position in which the front-rear pair of engaging protrusions 48 are intruded into both the engageable recess portions 32 and the engageable recess portions 44.

When in the lifter selected state and the operation lever 30 is rotationally operated toward the direction of arrow D or toward the direction of arrow E, each of the engaging protrusions 48 engages with the respective top and bottom engagement walls 32A of the intruded into engageable recess portions 32, and rotational operation force of the operation lever 30 is transmitted to the operation load input portion 28, namely to the pump lifter mechanism 22F. However, when in the recliner selected state and the operation lever 30 is rotationally operated toward the direction of arrow D, each of the engaging protrusions 48 engages with the respective top and bottom engaging walls 44A of the intruded into engageable recess portions 44, and rotational operation force of the operation lever 30 rotates the reclining release plate 38 in the direction of arrow F.

The operation portion 45 is also configured so that in a non-operation state in which no operation force is input, the operation lever 30 takes up the lifter selected state. Specifically, as shown in FIG. 1, there is a extension coil spring 50 provided as a biasing member, that biases the operation lever 30 toward the first predetermined position. Anchor portions 50A are formed at each end of the two ends of the extension coil spring 50 there. The extension coil spring 50 has each of the different anchor portions 50A anchored to engaging holes 38D, 46D that are formed, respectively, in the supported boss portion 38B and the supported boss 46B, in a state of intrusion into the supported boss portion 38B of the reclining release plate 38 and the supported boss 46B of the lever cap 46 (see FIG. 1).

The operation lever 30 is thereby biased to the first predetermined position by the biasing force of the extension coil spring 50. The configuration is such that in this state, the operation lever 30 is held in the first predetermined position by engagement of the front-rear pair of engaging protrusions 48 with the corresponding stopper walls 32B of the engageable recess portions 32. Therefore, it is configured in the operation portion 45 such that, when the lock state of the reclining mechanism 20 is to be released, the operation lever 30 is moved to the outside in the seat width direction (direction of arrow G in FIG. 3 to FIG. 5), against the biasing force of the extension coil spring 50. The operation lever 30 that has been moved in the direction of arrow G from the first predetermined position is held in the second predetermined position, by engagement of the front-rear pair of engaging protrusions 48 with the corresponding stopper walls 44B of the engageable recess portions 44.

Furthermore, since the extension coil spring 50 is anchored to the lever cap 46 and the reclining release plate 38, load being input in a torsion direction to the extension coil spring 50 during lifter operation may be prevented. Furthermore, as shown in FIG. 2, FIG. 3B, and FIG. 4B, the opening diameter of the supported portion 30B of the operation lever 30 is greater than the maximum height of the reclining release plate 38, including the arm portion 38C. In this manner, the operation portion 45 may be configured by assembling the operation lever 30, the reclining release plate 38, the extension coil spring 50 and the lever cap 46, in that order. It may also be configured such that when assembling the engageable recess portions 32 with the front-rear pair of engaging protrusions 48, these are temporarily held by the operation lever 30.

As shown in FIG. 5, the side end portion of the seat cushion 12 (seat cushion frame 16) is covered by cover member 52 (omitted in FIG. 3 and FIG. 4), and the operation lever 30 is disposed to the outside of the cover member 52. A gap is set between the cover member 52 and the operation lever 30 (at least to a lower portion thereof), for insertion of fingers therein.

Explanation will now be given of the operation of the exemplary embodiment.

In the vehicle seat 10 configured as described above, when a seat occupant is adjusting the height of the vehicle seat 10 in the direction to increase the seating height of a seat occupant, while still in the lifter selected state with the front-rear pair of engaging protrusions 48 intruded into the engageable recess portions 32 by the biasing force of the extension coil spring 50, for example, while the seat occupant grips the operation portion 30A of the operation lever 30, or while placing their fingers around the bottom face of the operation portion 30A, the seat occupant swings (a reciprocating rotation) the operation lever 30 between the neutral position and the upper operation position. Within the operation of the operation lever 30, the operation force that accompanies movement toward the upper operation position from the neutral position, is transmitted, through the front-rear pair of engaging protrusions 48 and the engageable recess portions 32 (engagement walls 32A), to the operation load input portion 28, namely to the pump lifter mechanism 22F, and the seat cushion 12, namely the vehicle seat 10, is displaced overall upward. When operation of the operation lever 30 is stopped at the desired height, the height of the seat cushion 12 is maintained at the adjusted height by the seat lifter 22.

In a similar manner, when a seat occupant is adjusting the direction to decrease the seating height of a seat occupant, while remaining in the lifter selected state, for example, the seat occupant while gripping the operation portion 30A of the operation lever 30, or while pressing the palm of their hand onto the top face of the operation portion 30A, swings (a reciprocating rotation) the operation lever 30 between the neutral position and the lower operation position. Within the operations of the operation lever 30, the operation force that accompanies movement toward the lower operation position from the neutral position is transmitted, through the front-rear pair of engaging protrusions 48 and the engageable recess portions 32 (engagement walls 32A), to the operation load input portion 28, namely to the pump lifter mechanism 22F, and the seat cushion 12, namely the vehicle seat 10, is displaced overall downward. When operation of the operation lever 30 is stopped at the desired height, the height of the seat cushion 12 is maintained at the adjusted height by the seat lifter 22.

On the other hand, when a seat occupant is adjusting the angle of the seat back 14 with respect to the seat cushion 12, the seat occupant, for example, puts their fingers between the operation lever 30 and the cover member 52, and moves the operation lever 30 in the direction of arrow G, switching to the recliner selected state in which the front-rear pair of engaging protrusions 48 are intruded into the corresponding engageable recess portions 44 (moving to the second predetermined position). While maintaining this recliner selected state, if the operation portion 30A is pulled upward, the rotational operation of the operation lever 30 in the direction of arrow D is transmitted, through the front-rear pair of engaging protrusions 48 and the engageable recess portions 44 (engaging walls 44A) to the reclining release plate 38, and the reclining release plate 38 rotates in the direction of arrow F. Thereby the lock release arm 20F lock of the reclining mechanism 20 is rotated in the direction of arrow A, and the lock of the reclining mechanism 20 is released.

The seat occupant places their body weight against the seat back 14, tilts the seat back 14 backward, and stops at the desired position, or stops the seat back 14, which is swinging up with the biasing force of the return spring, at the desired position. When the seat occupant releases the operation force in the up-down direction from the reclining lever 30, the reclining mechanism 20 returns to the locked state by the biasing force of the torsion spring 20E. Also, when the operation force to the outside in the seat width direction is released, the operation lever 30 returns to the lifter selected state by the biasing force of the extension coil spring 50.

In the vehicle seat 10 provided with the operation portion 45, since both the reclining mechanism 20 and the seat lifter 22 can be operated independently (selectively) by the single operation lever 30, the operation lever 30 is disposed in a position with good operability for a seat occupant and by doing so the operability of both the reclining mechanism 20 and the seat lifter 22 may be realized.

Regarding this point, comparing such a configuration with that of a comparative example of FIG. 8, in a vehicle seat 200 according to a comparative example, operating portions 202A, 204A operated by a seat occupant are disposed a large distance apart in order for a lifter knob 202 for seat height adjustment and a reclining lever 204 for reclining lock release to be operated independently from each other. Due to this, the necessary minimum dimensions and space for independent operation must be secured for each of the lifter knob 202 and the reclining lever 204, and there are many restrictions on the dimensions, shape and arrangement thereof. Specifically, in the vehicle seat 200, only one of the operating portions 202A, 204A can be placed in a position that has good operability for a seat occupant, and in the comparative example, since the position of the reclining lever 204 is at a rear portion of the seat, it is not easily reached, and there is a worry that the seatbelt device 206 (buckle anchor portion) might get in the way of a hand when operating. Furthermore, the arm length (front-rear length) of both the lifter knob 202 and the reclining lever 204 are restricted to being short, and so there is a limit to the reduction that may be made to the operation force. Also, since precedence is given to securing the functionality of each of the lifter knob 202 and the reclining lever 204 within the above described limited space, there is little degree of freedom for decoration and design in the vehicle seat 200.

In this manner, in a vehicle seat, there is a limited range that provides good operability for a seat occupant, but with the vehicle seat 10, since the operation lever 30 is made common for the reclining mechanism 20 and the seat lifter 22, the limitations to the arrangement and size of the reclining lever 30 are reduced, and an increase in the degrees of freedom for design is achieved. Specifically, the single operation lever 30 may be disposed in a suitable position (further toward the rear than the lifter knob 202) that avoids interference with a seat belt device of the like and that is easily reached, with the operability of the reclining mechanism 20 and the seat lifter 22 secured and improved. Furthermore, since there is a high degree of freedom for setting the arm length in the operation lever 30, the operation force and the operation stroke may be appropriately set. In the present exemplary embodiment a reduction of the operation force may be achieved by using a comparatively long operation lever 30.

In this manner, in the vehicle seat 10 according to the present exemplary embodiment of the invention, the operability may be improved of the reclining mechanism 20 and the seat lifter 22. Furthermore, since the number of operation components may be reduced, the restrictions on the placement positions, dimensions and shape of operation portions for operable units other than the reclining mechanism 20 and the seat lifter 22 are reduced, and it becomes possible to place these in positions with good operability. Also, since the number of operation components may be reduced, not only is there an increase in the degrees of freedom for design, by the "look" is improved.

Also, since the vehicle seat 10 is configured so that a lifter selected state and a recliner selected state may be switched by the position of the operation lever 30, there is no need to operate an operation portion dedicated to switching, and the flow of actions, including switching and adjusting, becomes simple. Furthermore, since the operation direction of the operation lever 30 when adjusting the reclining mechanism 20 and when adjusting the seat lifter 22 is, in either case, displacement of the front end of the operation portion 30A in the up-down direction, rotation about the shaft 34, there is no feeling of awkwardness imparted to the operator (seat occupant), and both the reclining mechanism 20 and the seat lifter 22 may be operated by the single operation lever 30. However, when switching between the recliner selected state and the recliner selected state, the operation direction of the operation lever 30 is different from when carrying out adjustment of the reclining mechanism 20 or the seat lifter 22, and therefore unintentional operation by the seat occupant may be avoided.

Also, in the vehicle seat 10, since switching between the lifter selected state and the recliner selected state is by the front-rear pair of engaging protrusions 48 provided to the operation lever 30 moving toward or retreating with respect to the engageable recess portions 32 of the operation load input portion 28, and moving toward or retreating with respect to the engageable recess portions 44 of the reclining release plate 38, a function for preventing unintentional operation by a seat occupant may be realized using a simple structure. In particular, since the operation lever 30 is held in the first predetermined position by the constant bias of the biasing force of the extension coil spring 50, the reclining mechanism 20 or the seat lifter 22 may be adjusted without confirming the position of the operation lever 30. After adjusting the reclining mechanism 20 the operation lever 30 returns to the lifter selected state, and therefore there is good operability thereof.

It should be noted that while in the above described exemplary embodiment an example in which the switching between the lifter selected state and the recliner selected state was carried out by displacement of the operation lever 30 in the seat width direction, the present invention is not limited thereto, and, for example, the switching between the lifter selected state and the recliner selected state may be carried out by displacement of the operation lever 30 in the front-rear direction.

Also, an example was given in the above described exemplary embodiment in which the usual state is that of the lifter selected state, due to the biasing force of the extension coil spring 50, but the present invention is not limited thereto, and, for example, the usual state may be configured to be that of the recliner selected state.

Furthermore, in the above described exemplary embodiment an example was given in which the seat lifter 22 and the reclining mechanism 20 were provided as the first and second adjustable units, however, the present invention is not limited thereto, and, for example, the invention may be configured with other adjustable units as the object of adjustment by operation of the operation lever 30. Examples that may be given of other adjustable units include a seat front portion tilt mechanism for adjusting the height of the front portion of the seat cushion 12 relative to the back portion thereof, or a seat plane angle adjusting mechanism for adjusting the seat plane angle relative to the floor.

Also, in the above exemplary embodiment, an example has been given of the present invention as applied to vehicle seats 10, however, the present invention is not limited thereto, and the present invention may be applied to various passenger seats and leisure chairs, as well as office chairs.

The invention claimed is:

1. A seat comprising:
a first adjustable unit, provided to a seat body that is for sitting on, the first adjustable unit being adjusted by transmitted operation force;
a second adjustable unit, provided to the seat body, the second adjustable unit being adjusted by transmitted operation force; and
an operation member, able to take up a first predetermined position in which operation force from operation by a seat occupant is able to be transmitted to the first adjustable unit, and a second predetermined position in which operation force from operation by the seat occupant is able to be transmitted to the second adjustable unit;
wherein the operation member is in the first predetermined position when no force is applied to the operation member by the seat occupant;
wherein the operation member is configured to switch between the first predetermined position and the second predetermined position by displacement of the entire operation member along a seat width direction;
wherein a movement direction of the operation member between the first predetermined position and the second predetermined position is different from both an operation direction when operation force is transmitted to the first adjustable unit, and from an operation direction when operation force is transmitted to the second adjustable unit;
wherein the operation member is provided to a side portion of a seat cushion configuring the seat body;
wherein the operation member is supported so as to be able to rotate with respect to the seat cushion about an axis along the seat width direction;
wherein the operation member transmits operation force from rotation about the axis to the first adjustable unit or to the second adjustable unit;
wherein the first adjustable unit is a height adjusting mechanism for adjusting the position of the seat body in the up-down direction;
wherein the second adjustable unit is a reclining mechanism for switching between a state in which the angle of a seat back is locked with respect to a seat cushion and an unlocked state thereof; and
wherein when the operation member is in the first predetermined position, the operation member is configured to rotate coaxially together with a shaft of the height adjusting mechanism.

2. The seat according to claim 1, wherein the operation member is a lever in which:
a rear end side of the lever in the seat front-rear direction is supported to as to be able to rotate with respect to the seat cushion about an axis along the seat width direction; and
a front end side of the lever in the seat front-rear direction is configured to rotate at least one of upward or downward when the operation force is applied to the front end side of the lever.

3. The seat according to any one of claims 1 and 2, wherein the operation member has an engaging portion, and:
in the first predetermined position the engaging portion engages with an engageable portion of the first adjustable unit so as to make it possible for operation force to be transmitted thereto, and engagement with an engageable portion of the second adjustable unit is released; and
in the second predetermined position the engagement with the engageable portion of the first adjustable unit is released, and the engaging portion engages with the engageable portion of the second adjustable unit so as to make it possible for operation force to be transmitted thereto.

4. The seat according to any one of claims 1 and 2, further comprising a biasing member that biases the operation member to the first predetermined position.

* * * * *